United States Patent [19]

Simjian

[11] 4,317,028
[45] Feb. 23, 1982

[54] SUBSCRIBER CHECK ACCEPTING AND ISSUING APPARATUS

[76] Inventor: Luther G. Simjian, 1750 S. Ocean La., Fort Lauderdale, Fla. 33316

[21] Appl. No.: 142,263

[22] Filed: Apr. 21, 1980

[51] Int. Cl.³ .............................................. G06K 7/00
[52] U.S. Cl. .................................... 235/380; 235/379; 235/381
[58] Field of Search ................ 235/375, 379, 381, 380

[56] References Cited
U.S. PATENT DOCUMENTS 3,973,237  8/1976  Sawaguchi .......................... 235/379
4,219,151  8/1980  Haruki .................................. 235/379

*Primary Examiner*—Harold I. Pitts

[57] ABSTRACT

An apparatus for determining the validity of an encoded check adapted to operate a metering device comprises means for accepting the encoded check. Decoding means decode the check and provide a check code responsive signal. Additionally, the apparatus includes subscriber operated code means to provide a subscriber identifying code signal. Computer means check for correlation of these signals and also are programmed to check credit data. If the computer means determines authenticity, a signal is provided to check storage and dispensing means for issuing a new check which in character and nature is substantially identical with the accepted check, except for encoding. Prior to rendering the check available to a subscriber, the new issued check is encoded for causing it to be operable with a predetermined metering device. In the alternative embodiment, the same check accepted is re-encoded and rendered available to the subscriber.

6 Claims, 3 Drawing Figures

SUBSCRIBER CHECK ACCEPTING AND ISSUING APPARATUS

SUMMARY OF THE INVENTION

This invention refers to metering devices, such as postage meters, which issue units of value, such as postage, while the credit register in such a metering device is provided with a predetermined amount of credit. When the credit is exhausted or falls below a predetermined limit, the operation of the metering device is inhibited and the credit register must be replenished. Such replenishing is accomplished by bringing the register to the Post Office and paying a certain sum of money whereupon an authorized clerk resets the credit register to reflect such payment of money, that is, credit. In more recent arrangements, the register can be replenished by a prescribed telephone and computer accounting procedure, see U.S. Pat. No. 3,792,446 issued to Robert B. McFiggins et al. dated Feb. 12, 1974 entitled "Remote Postage Meter Resettng Method". A further arrangement has been described by this applicant in which a postage meter becomes operable by the use of a predetermined check which is encoded with subscriber data and/or credit data. The check must be brought into cooperative relation with the postage meter for causing the credit register to be enabled to be reset so as to reflect an increase of credit. Reference is made to U.S. Patent application Ser. No. 952,637 entitled "Metering System" filed Dec. 19, 1978 now U.S. pat. No. 4,222,518 dated Sept. 16, 1980; to U.S. Patent application Ser. No. 970,995 entitled "Metering System" filed Dec. 19, 1978 nowU.S. Pat. No. 4,226,360 dated Oct. 7, 1980; and to U.S. Patent application Ser. No. 39,170 entitled "Coupon Controlled Metering Device" filed May 15, 1979 now U.S. Pat. No. 4,218,011 dated Aug. 19, 1980.

The present invention is related to the last mentioned arrangements and concerns an apparatus for issuing a check which is adapted to be used for resetting the credit register of a particular postage meter. To this end, the apparatus receives a check previously used by the subscriber in conjunction with his metering device, means are provided to check the authenticity of the check and the credit of the subscriber, and in response to finding the check authentic and the credit of the subscriber acceptable, means provided in the apparatus issue a new encoded check which is usable by the subscriber to, once again, reset the credit register of a metering device under his control.

The apparatus described hereinbefore serves as a vending machine for issuing checks usable in conjunction with postage meters and such apparatus, quite obviously, may be combined with, or be disposed at locations having, the well known bank teller machines. Hence, a subscriber no longer is required to purchase a check at an authorized location, such as the Post Office, but can obtain a valid check at many locations during or outside of conventional business hours. The subscriber, therefore, is greatly aided by a convenient service and, in the most preferred way, utilizing normal banking channels.

Other important features of the present invention will be apparent by the following description when taken in conjunction with the accompanying drawings.

DETAILED DESCRIPTION OF THE INVENTION

Figure 3:
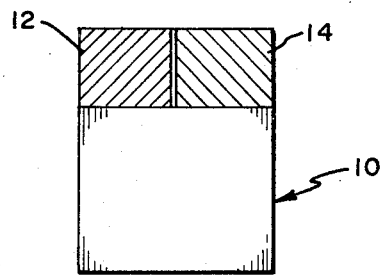
FIG. 3 is a plan view of a check used in the present arrangement.

Referring now to the figures and FIG. 3 in particular, numeral 10 designates a check as shown in the previous patents and adapted to render a metering device of the type stated hereinabove operable by resetting the credit register of the metering device. The check may be encoded in field 12 with data pertaining to the particular meter, or credit register, which it is rendering operable or has rendered operable, or which it has reset to reflect an increased amount of credit. Field 14 may be encoded with data pertaining to the amount of money by which the credit is or was reset, such coding may still exist or having been erased during the preceding resetting operation. As shown, the check per FIG. 3 is one which a subscriber brings to the apparatus shown in FIG. 1 in order to receive a new check by means of which the meter under his control can be reset to reflect an increased credit balance in the credit register. Encoding of fields 12 and 14, typically, is done by a magnetic code.

Figure 1:
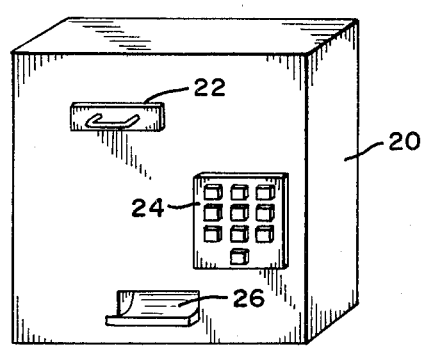
FIG. 1 is a perspective view of the present apparatus.
Figure 2:
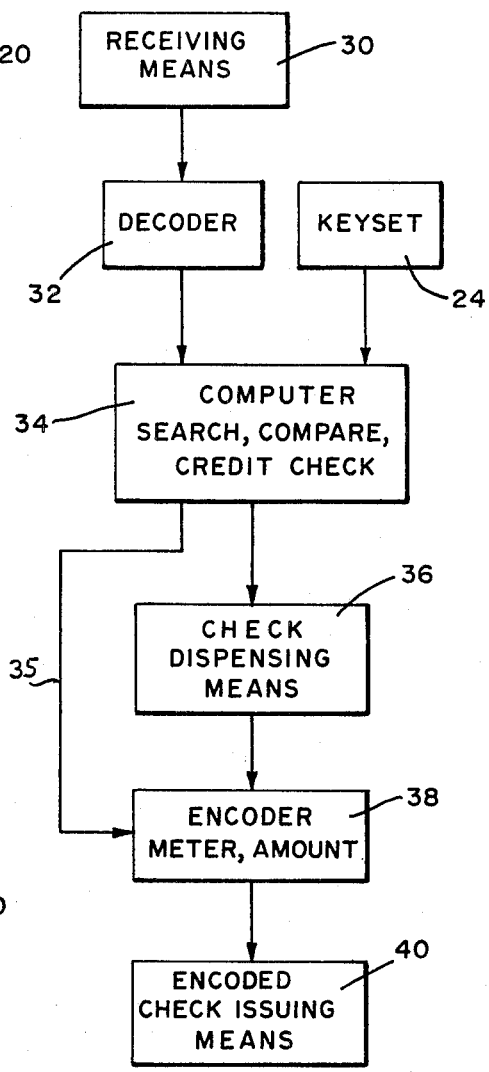
FIG. 2 is a flow diagram of the functions performed by the apparatus.

With reference to FIG. 1, the apparatus comprises a housing 20 which contains a slide 22 for receiving thereupon a check 10, a pushbutton key set 24 for operation by the subscriber to develop a subscriber identifying code signal, and a chute 26 at which a new encoded check is obtained for use by the subscriber to operate the meter under his control. The remainder of the necessary functions and means therefor are enclosed within the housing and are more clearly apparent by reference to FIG. 2.

A check 10, upon being received by the slide 22 and upon closing the slide, is conveyed by receiving means 30 into cooperative relation with a decoding means 32 adapted to decode the field 12, the code data pertaining to the subscriber's metering device. The decoding means 32 decodes the data from field 12 and generates a check code responsive signal which is fed to the computer 34. The subscriber by instructions, not shown, is also requested to develop a subscriber identifying code signal by depressing in sequence the appropriate pushbuttons of key set 24. This subscriber identifying code signal also reaches the computer 34. The computer, therefore, receives the subscriber identifying signal as well as the check responsive signal which identifies the metering device in the subscriber's possession. Previously, the various subscriber data and the respective meter data were entered into the storage means of the computer. Responsive to the receipt of both signals, the computer 34 searches its storage (memory) for the correctness of the check responsive code signal (field 12) and the subscriber identifying signal being associated therewith to thereby establish the authenticity of the check 10. If authenticity is not established, the check 10 optionally is ejected from the enclosure 20 or retained for investigative purposes. The subscriber identifying signal can be used as the address signal for the memory.

Moreover, a check is made in respect to the credit of the subscriber using the computer stored data and using, once again, the subscriber identifying signal as the address signal.

Assuming that the authenticity of the check 10 has been established and that the credit of the subscriber is satisfactory, the computer 34 sends a suitable authenticity signal to the check dispensing means 36 which contains a supply of checks for issuance to subscribers. These checks are in nature and character substantially identical with an accepted check 10, except for the final encoding. The dispensing means 36 withdraws, responsive to the authenticity signal, a check from storage and brings the check into communication with encoding means 38. The encoding means 38 receives a meter identifying signal 35 from the computer 34 and, hence, encodes the field 12 to thereby associate the new check with the metering device in possession of the subscriber. Optionally, the encoding means 38 also encodes the field 14 with coded data pertaining to the credit increment by which the credit register is to be reset, such increment information being either taken from field 14 of the accepted check, or being supplied by the subscriber by once again operating the key set 24, or being contained and stored as preset data in the computer 34. Alternatively, the check may also be encoded with other data deemed significant of interest for accounting and integrity purposes.

Responsive to the encoding being completed, issuing means 40 are actuated which cause the newly prepared and encoded check to reach the chute 26 for being rendered accessible to the subscriber and removed by the subscriber. This check, now associated with a particular meter, can be used to once again reset the credit register of the metering device so as to reflect an increased credit balance.

In an alternative embodiment, the check 10 which may contain cancellation data, upon being checked and authenticated by the computer 34, is re-encoded by the encoding means 38, thus the same check after being suitably encoded is used instead of issuing a new check. This latter arrangement saves or bypasses the check dispensing means 36. Any special data on the check 10 arising from the preceding use of the check 10 in the metering device may be transferred to the computer storage means for readout by cognizant authorities. The latter arrangement presupposes, of course, that the check 10 is relatively sturdy and not subject to significant deterioration arising from use and handling by a subscriber.

The above description recites the use of magnetic encoding. It should be understood that any of the commonly used code means will be deemed acceptable for the present invention.

While there has been described and illustrated a preferred embodiment of my invention and several variations have been indicated, it will be apparent to those skilled in the art that various further modifications and changes may be made without deviating from the broad principle of this invention which shall be limited only by the scope of the appended claims.

What is claimed is:

1. A subscriber operable apparatus including check receiving means, dispensing means and computer means for establishing the authenticity of a check accepted by searching its stored account data comprising:
   means for receiving an encoded check adapted to having been used for operating a metering device;
   means for providing a subscriber identifying code signal;
   means for decoding an encoded check of the type stated received by said means for receiving and providing a check code responsive signal;
   computer means coupled for receiving said subscriber identifying code signal and said check code responsive signal and in response to the receipt of both said signals searching its stored account data and determining the authenticity of said received check and providing an authenticity signal responsive to authenticity of said check having been established;
   check storage and dispensing means for storing checks in character and nature substantially identical with said accepted check coupled for dispensing a new check responsive to the receipt of said authenticity signal;
   encoding means coupled for encoding said dispensed check responsive to data provided by said computer means for rendering said check valid for operating a metering device, and
   issuing means for rendering said dispensed new and enclosed check available to a subscriber.

2. A subscriber operable apparatus as set forth in claim 1, said computer means including in its stored data credit information correlated with a subscriber and addressable by said subscriber identifying signal.

3. A subscriber operable apparatus as set forth in claim 1, said encoded check received being encoded with identifying data pertaining to a metering device, said means for decoding providing a signal responsive to said meter identifying data to said computer means, and said encoding means encoding said dispensed check with identifying data pertaining to the metering device provided by said computer means.

4. A subscriber operable apparatus including check receiving means, dispensing means and computer means for establishing the authenticity of a check accepted by searching its stored account data comprising:
   means for receiving an encoded check adapted to having been used for operating a metering device;
   means for providing a subscriber identifying code signal;
   means for decoding an encoded check of the type stated received by said means for receiving and providing a check code responsive signal;
   computer means coupled for receiving said subscriber identifying code signal and said check code responsive signal and including means for determining correlation between both said codes by comparing said codes with stored account data to thereby establish authenticity of said received check, and including means for checking stored credit data of the subscriber responsive to the receipt of said subscriber identifying code signal;
   said computer means including further means for causing an authenticity signal responsive to such correlation and acceptable stored credit data;
   check storage and dispensing means for storing checks in character and nature substantially identical with said accepted check coupled for dispensing a new check from its storage responsive to said authenticity signal;
   encoding means coupled for being responsive to data from said computer means for encoding said new check to render it valid for operating a metering device, and
   issuing means for rendering said dispensed and encoded check available to a subscriber.

5. A subscriber operable apparatus including check receiving and dispensing means and computer means for establishing the authenticity of a check accepted by searching its stored account data comprising:
- means for receiving an encoded check adapted to having been used for operating a metering device;
- means for providing a subscriber identifying code signal;
- means for decoding an encoded check of the type stated received by said means for receiving and providing a check code responsive signal;
- computer means coupled for receiving said subscriber identifying code signal and said check code responsive signal and in response to the receipt of both said signals searching its stored account data and determining the authenticity of the received check;
- encoding means coupled to said computer means for re-encoding said check responsive to said computer means having determined authenticity of the received check, and
- issuing means for rendering the check re-encoded responsive to said computer having determined authenticity available to a subscriber.

6. A subscriber operable apparatus as set forth in claim 5, said computer means including in its stored data credit information correlated with a subscriber and addressable by said subscriber identifying code signal.

* * * * *